United States Patent
Li et al.

(10) Patent No.: US 9,482,823 B1
(45) Date of Patent: Nov. 1, 2016

(54) FIBER ATTENUATOR BASED ON MPO LOOPBACK ASSEMBLY HAVING ANGLED FERRULES

(71) Applicant: Alliance Fiber Optic Products, Inc., Sunnyvale, CA (US)

(72) Inventors: Yao Li, Newark, CA (US); Ximao Feng, Foster City, CA (US); Kenhao Liu, New Taipei (TW); Gang Xu, Dongguan (CN)

(73) Assignee: Alliance Fiber Optics Products, Inc., Sunnyvale, CA (US)

( * ) Notice: Subject to any disclaimer, the term of this patent is extended or adjusted under 35 U.S.C. 154(b) by 59 days.

(21) Appl. No.: 14/544,195

(22) Filed: Dec. 8, 2014

Related U.S. Application Data

(60) Provisional application No. 61/963,537, filed on Dec. 9, 2013.

(51) Int. Cl.
G02B 6/38 (2006.01)

(52) U.S. Cl.
CPC .............. *G02B 6/381* (2013.01); *G02B 6/3885* (2013.01); *G02B 6/38* (2013.01); *G02B 6/3833* (2013.01); *G02B 6/3839* (2013.01); *G02B 6/3893* (2013.01)

(58) Field of Classification Search
CPC .... G02B 6/3885; G02B 6/3839; G02B 6/38; G02B 6/381; G02B 6/3893; G02B 6/3833
See application file for complete search history.

(56) References Cited

U.S. PATENT DOCUMENTS

| | | | |
|---|---|---|---|
| 4,979,793 A | 12/1990 | Bowen et al. | |
| 5,259,045 A | 11/1993 | Azuma et al. | |
| 5,311,614 A | 5/1994 | Caron et al. | |
| 5,475,781 A | 12/1995 | Chang et al. | |
| 5,677,977 A | 10/1997 | Smith | |
| 6,454,464 B1 | 9/2002 | Nolan | |
| 6,707,979 B2 | 3/2004 | Wang et al. | |
| 2002/0131699 A1* | 9/2002 | Raguin | G02B 6/322 385/33 |
| 2003/0002769 A1* | 1/2003 | Lovely | G01H 9/004 385/12 |
| 2008/0159697 A1* | 7/2008 | Lu | G02B 6/3863 385/85 |
| 2010/0104245 A1* | 4/2010 | Nishimura | G02B 6/3885 385/81 |
| 2011/0262079 A1* | 10/2011 | Kato | B29C 45/0025 385/78 |
| 2013/0170797 A1* | 7/2013 | Ott | G02B 6/3885 385/60 |

* cited by examiner

*Primary Examiner* — Thomas A Hollweg
*Assistant Examiner* — Mary A El Shammaa
(74) *Attorney, Agent, or Firm* — Dinsmore & Shohl LLP

(57) ABSTRACT

An apparatus comprises a first array of angled ferrules and a second array of angled ferrules, a plurality of angled fibers, wherein first ends of the plurality of angled fibers are held in the first array of angled ferrules and second ends of the plurality of angled fibers are held in the second array of angled ferrules, a first array of non-angled ferrules and a second array of non-angled ferrules, a first plurality of non-angled fibers held in the first array of non-angled ferrules, a second plurality of non-angled fibers held in the second array of non-angled ferrules, wherein the first array of angled ferrules is aligned and connected with the first array of non-angled ferrules and the second array of angled ferrules is aligned and connected with the second array of non-angled ferrules.

13 Claims, 14 Drawing Sheets

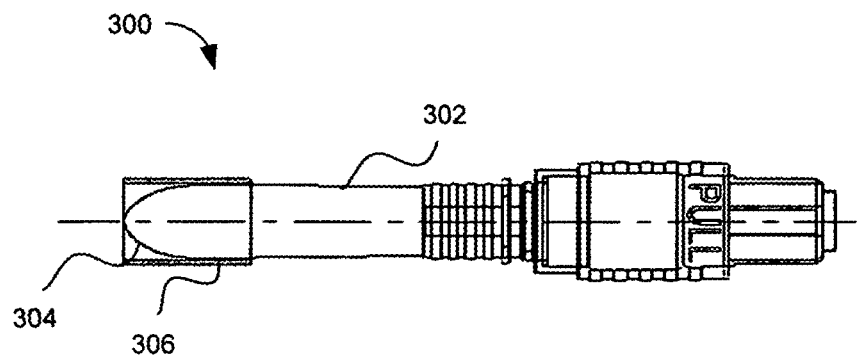
Prior Art  FIG. 3
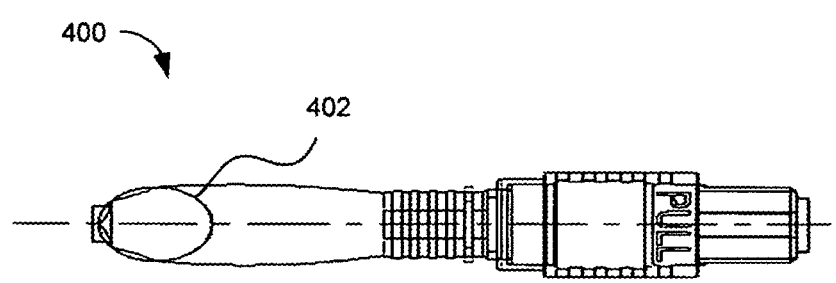
Prior Art  FIG. 4

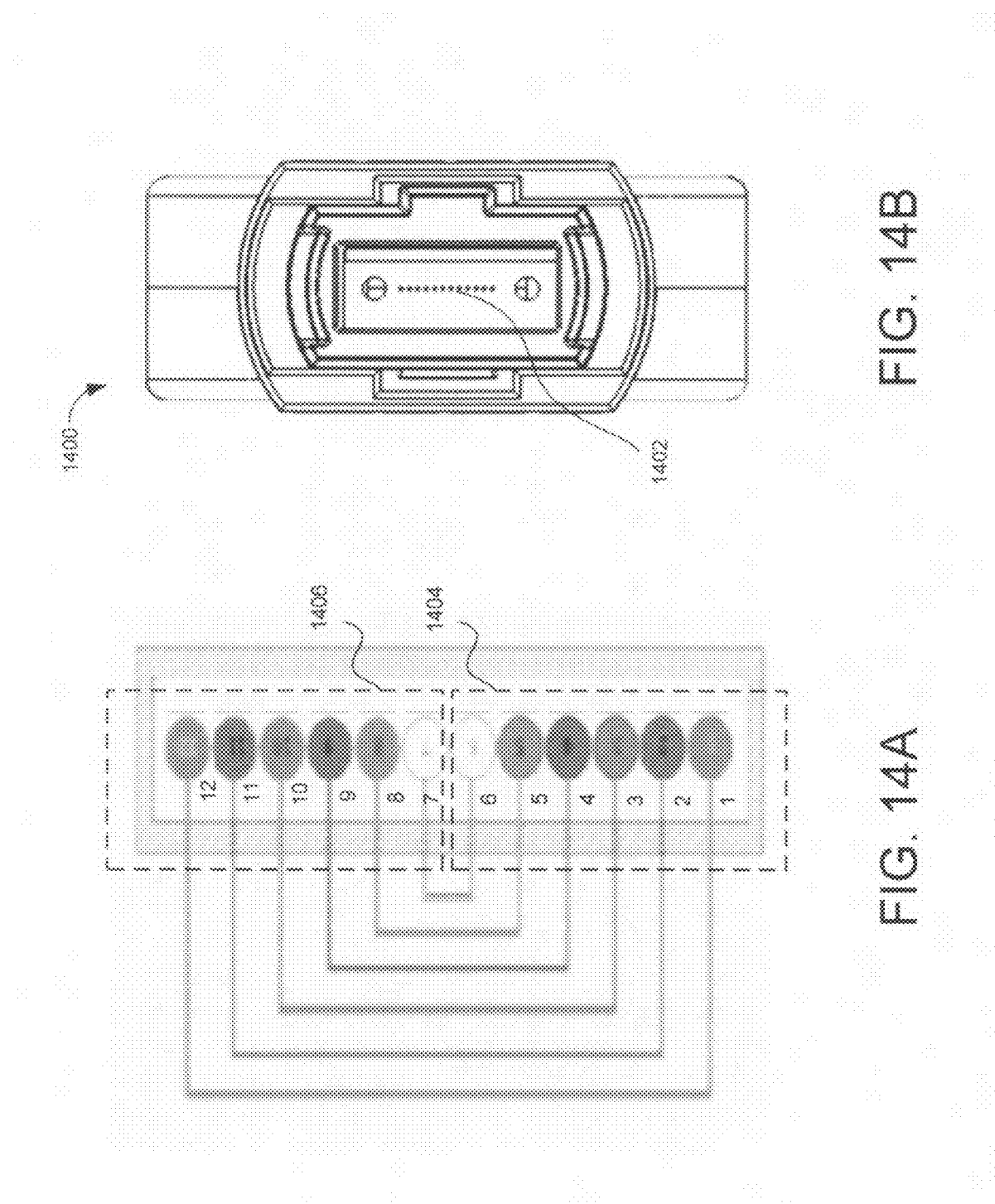

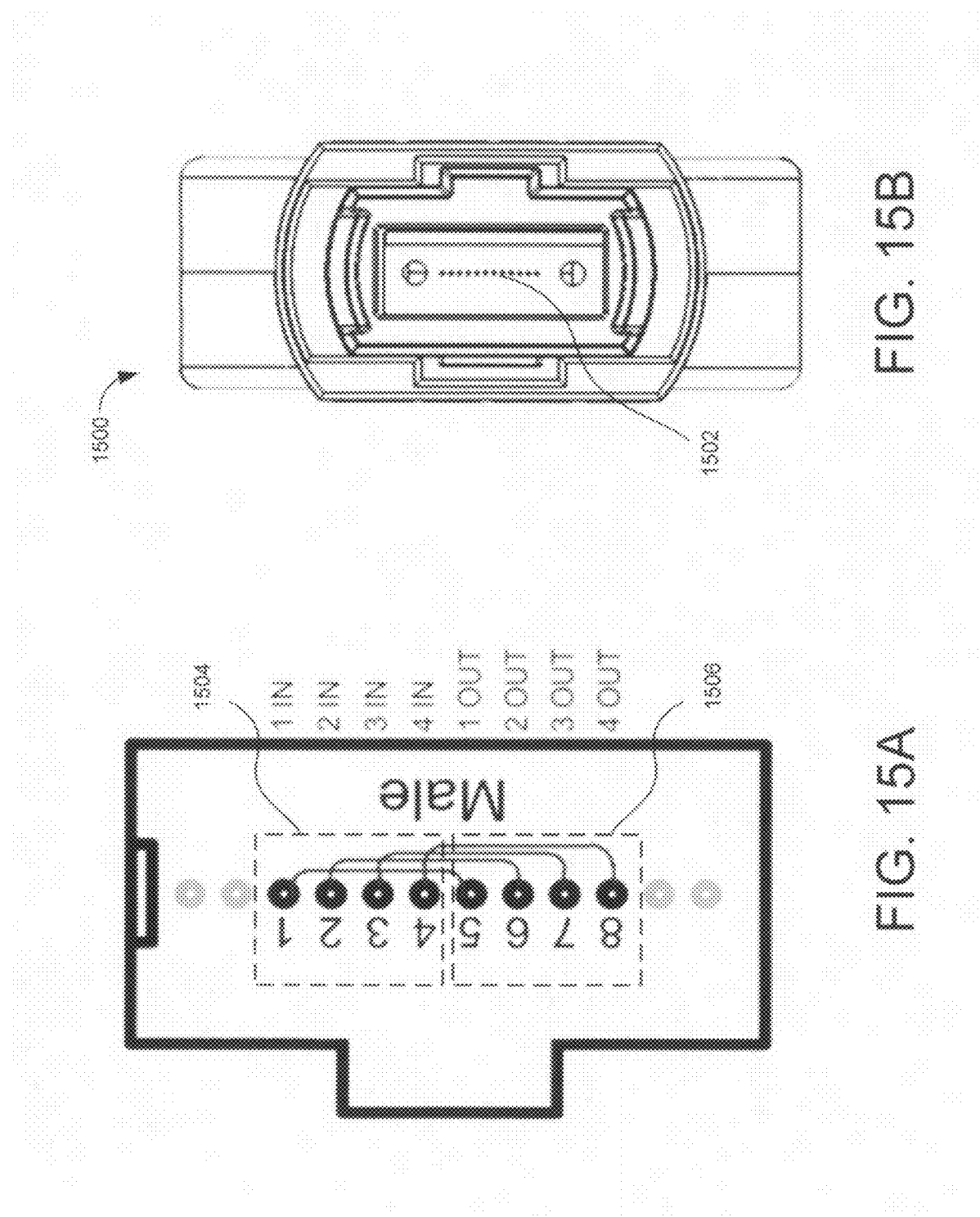

FIBER ATTENUATOR BASED ON MPO LOOPBACK ASSEMBLY HAVING ANGLED FERRULES

CROSS-REFERENCE TO RELATED APPLICATIONS

This application claims the benefit to U.S. Provisional Application No. 61/963,537, filed on Dec. 9, 2013.

FIELD OF THE INVENTION

This invention relates to a fiber attenuator based on MPO loopback assembly and more specifically to a fiber attenuator based on MPO loopback assembly having angled ferrules.

BACKGROUND OF THE INVENTION

In a fiber telecom network, signal transmitted from a transmitter is attenuated along its propagation in the network. The receiver will detect a signal that is weaker than the signal transmitted at the transmitter. The signal may be attenuated because of attenuation loss, return loss, and the like. In other words, when a signal is received by a receiver, the signal may be lower than the level that can be detected by the receiver, although the signal is transmitted with higher power at the transmitter. Accordingly, the transmitter needs to be tested for sufficient transmitting a signal that can be detected by the receiver.

The transmitter is typically tested using a fiber attenuator based on loopback assembly between the transmitter and the receiver to provide the required attenuation between the transmitter and the receiver. The loopback assembly simulates the long fiber connection between the transmitter and the receiver. The loopback assembly traditionally comprises a fiber doped with material to absorb light propagating in the fiber. Thus, a short fiber can gives an effect of a long fiber in the network.

A loopback assembly based on doped fiber is typically expensive. Accordingly, a low cost loopback assembly is desired. In addition, the loopback assembly is required to have the same performance for multimode fibers as well as single mode fibers.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

FIG. 3 shows MPO loopback assembly based on fiber bending loss.

FIG. 4 shows MPO loopback assembly based on fiber bending loss of one or more loops.

FIGS. 14A and 14B show an exemplary embodiment of the present invention using MPO loopback assembly.

FIGS. 15A and 15B show an exemplary embodiment of the present invention using MPO loopback assembly.

Figure 1:
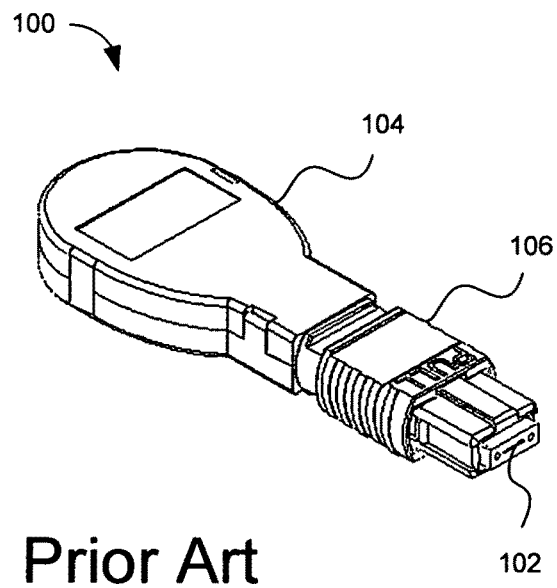
FIG. 1 shows typical MPO loopback assembly using MPO connector.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention.

DETAILED DESCRIPTION

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable combinations and/or sub-combinations in one or more embodiments.

A loopback assembly offers an effective way to test the performance of a transmitter, particularly for telecom and datacom requirements. A common array fiber connector such as a Multiple-Fiber Push-On/Pull-Off (MPO) connector may be used. It allows 12 fibers in a fiber array. FIG. 1 shows a typical MPO loopback assembly 100 that uses a MPO connector 106. Each optical fiber in an array 102 is bent to form a half circle 104 and thus it is referred to as a loopback assembly. A MPO loopback assembly can loop back 1 to 6 fibers at any one of the 12 ferrules that hold fiber array 102.

Figure 2:
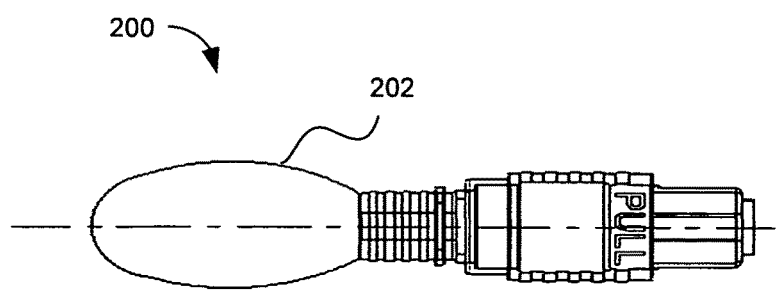
FIG. 2 shows MPO loopback assembly based on doped attenuating fiber.

MPO loopback assembly 100 of FIG. 1 may provide attenuation function. FIG. 2 shows a MPO loopback assembly 200, which may be a MPO transceiver self-test aiding device. Light from a transmitting port traversing a loopback fiber of MPO loopback assembly 200 reaches a receiving port with a predetermined attenuation value, e.g., 10 dB, which corresponds to the transceiver's designed reach distance. Therefore, without using a long fiber cable to cause 10 dB light transmission loss, MPO loopback assembly 200 may simulate the same effect with a compact packaging. The attenuation is traditionally provided by a specially doped fiber 202, which is designed to possess a predetermined attenuation value per unit length. Specially doped fiber 202 is bent and fit to the loopback housing. The cost of a fiber attenuator based on MPO loopback assembly employing eight attenuating fibers may already be prohibitively high. Therefore, the attenuating fiber based approach is practically limited to a single fiber connector or a duplex fiber connector that uses only one single fiber for loopback.

Alternatively, the fiber bending loss can be used for generating required attenuation in the loopback. Light leaks from a fiber if the fiber is subject to a severe bending. The amount of light leaking from the fiber depends on the numerical aperture of the fiber. If the bending radius of the fiber is less than a critical value known as a minimum bend radius, light inside the fiber starts to leak causing attenuation. By gradually reducing the bend radius, one may control the attenuation to a designed value. FIG. 3 shows a MPO loopback assembly 300 based on the fiber bending loss. MPO loopback assembly 300 comprises unbent fiber 302 and bent fiber 304, which is restrained by a tube 306. This embodiment is also disclosed in U.S. Pat. No. 6,707,979.

FIG. 4 shows a MPO loopback assembly 400 that uses similar fiber bending principle but treats bending loss as more distributive than a single section. One or more loops 402 of bent fibers are used to provide the total required loss. This method may prevent fiber from breaking caused by the stress that the fiber is subject to in its service life.

MPO loopback assemblies 300 and 400 suffer from a drawback in multimode (MM) fiber applications. Signals of different modes would have different losses under the same bend radius. In particular, higher order modes tend to leak out from the fiber much earlier than their lower order mode counterparts. This severe mode dependent attenuation in MM loopback attenuator causes issues to the MM MPO based transceiver tests. Multimode lasers from a vertical cavity surface-emitting laser (VCSEL) array often have mode hopping issues, which may lead to attenuation discrepancy from time to time leaving testing results unstable.

MPO loopback assemblies of the present invention aim to solve previous design's critical drawbacks such as high cost and mode dependent loss in MM fiber applications. Although an array fiber connector such as a MPO connector is disclosed as an illustration, the method can also serve for single fiber attenuation in straightforward configuration and in loopback configuration. The method is effective for both MM fiber and single mode (SM) fiber applications. The main idea is to use a polishing angle, an unpolished step, and AR coating layer to control the light transmission and its back-reflection so that both the insertion loss (IL) and reflection loss (RL) can be designed and determined.

Figure 5:
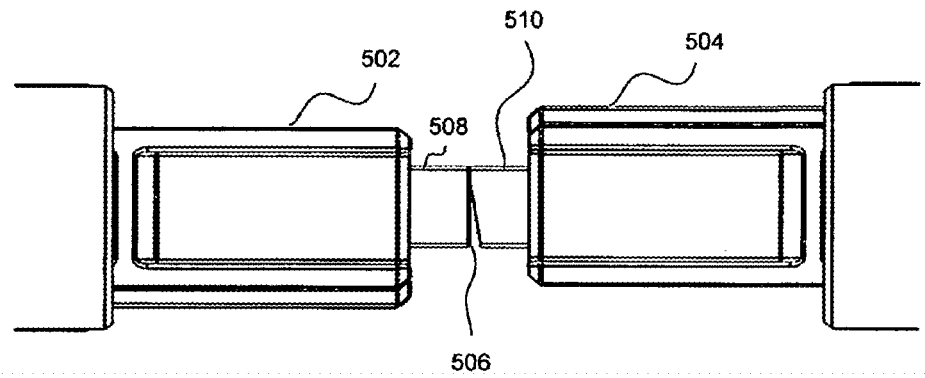
FIG. 5 shows MPO loopback assembly having angled ferrule connected to MPO connector having non-angled ferrule, in accordance with an embodiment of the present invention.

A MPO loopback assembly comprises an array of angled ferrules, which are connected to a MPO connector having an array of non-angled ferrules, in accordance with an embodiment of the present invention. The array of angled ferrules hold a plurality of angled fibers, and the array of non-angled ferrules hold a plurality of non-angled fibers. The plurality of angled fibers are aligned with the plurality of non-angled fibers. FIG. 5 shows a MPO loopback assembly 504 having an angled ferrule 510 is aligned with and connected to a MPO connector 502 having a non-angled ferrule 508, in accordance with an embodiment of the present invention. There is an air gap 506 between non-angled ferrule 508 and angled ferrule 510.

Angled ferrule 510 may be a ferrule of the array of angled ferrules. Non-angled ferrule 508 may be a ferrule of the array of non-angled ferrules. Angled ferrule 510 may be a ferrule of a single fiber connector. Similarly, non-angled ferrule 508 may be a ferrule of a single fiber connector. In an embodiment, angled ferrule 510 may be a ferrule of a duplex fiber connector.

Figure 6:
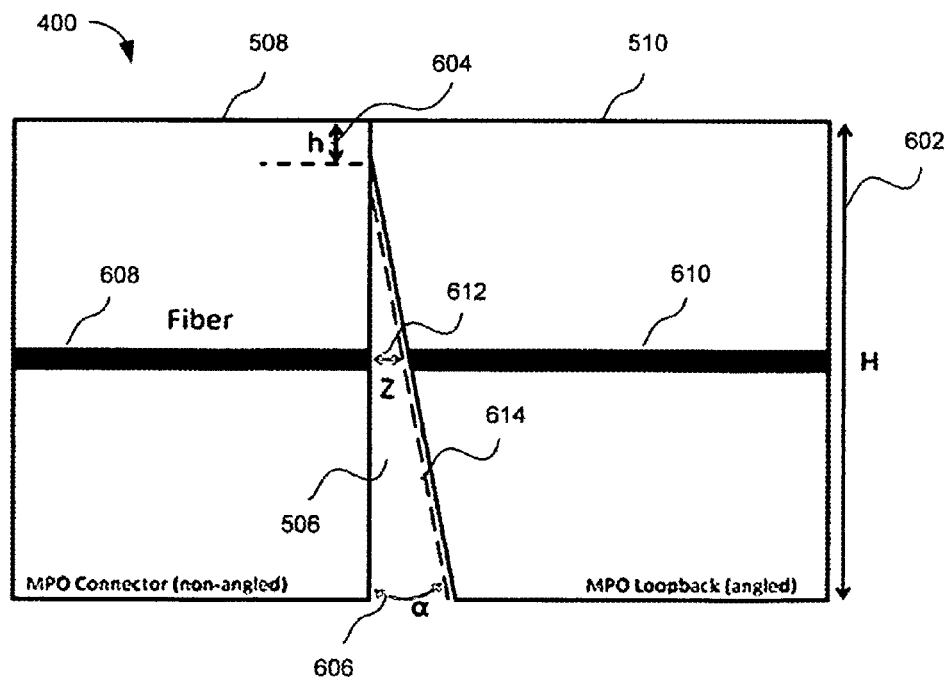
FIG. 6 shows non-angled ferrule and angled ferrule forming air gap, in accordance with an embodiment of the present invention.

FIG. 6 shows non-angled ferrule 508 and angled ferrule 510 forming an air gap 506, in accordance with an embodiment of the present invention. A thickness 602 of non-angled ferrule 508 and angled ferrule 510 is H. A thickness 604 of the unpolished step of angled ferrule 510 is h. A polish angle 606 of angled ferrule 510 is a. The distance of a gap 612 between a fiber 608 of non-angled ferrule 508 and a fiber 610 of angled ferrule 510 is Z. Fiber 610 is polished with the same polish angle α as angled ferrule 510. End of angled ferrule 510 is anti-reflection (AR) coated. An AR coating layer 614 is shown as dashed line along the surface of end of angled ferrule 510. End of fiber 610 is also AR coated with AR coating layer 614.

The typical reflection at an air-glass interface is 4% for uncoated glass surface. For a perfect AR coating, the reflection at an air-glass interface can be reduced to nearly zero. Therefore, depending on the AR coating, the reflection, R, at each air-glass interface can be from 0 to 4%. The transmission, T, is (1−R).

The distance of the air gap 612 between fiber 608 and fiber 610 can be calculated as:

$$Z = \tan(\alpha)\left(\frac{H}{2} - h\right),$$ Equation (1)

where the thickness of AR coating layer 614 is neglected.

Figure 7:
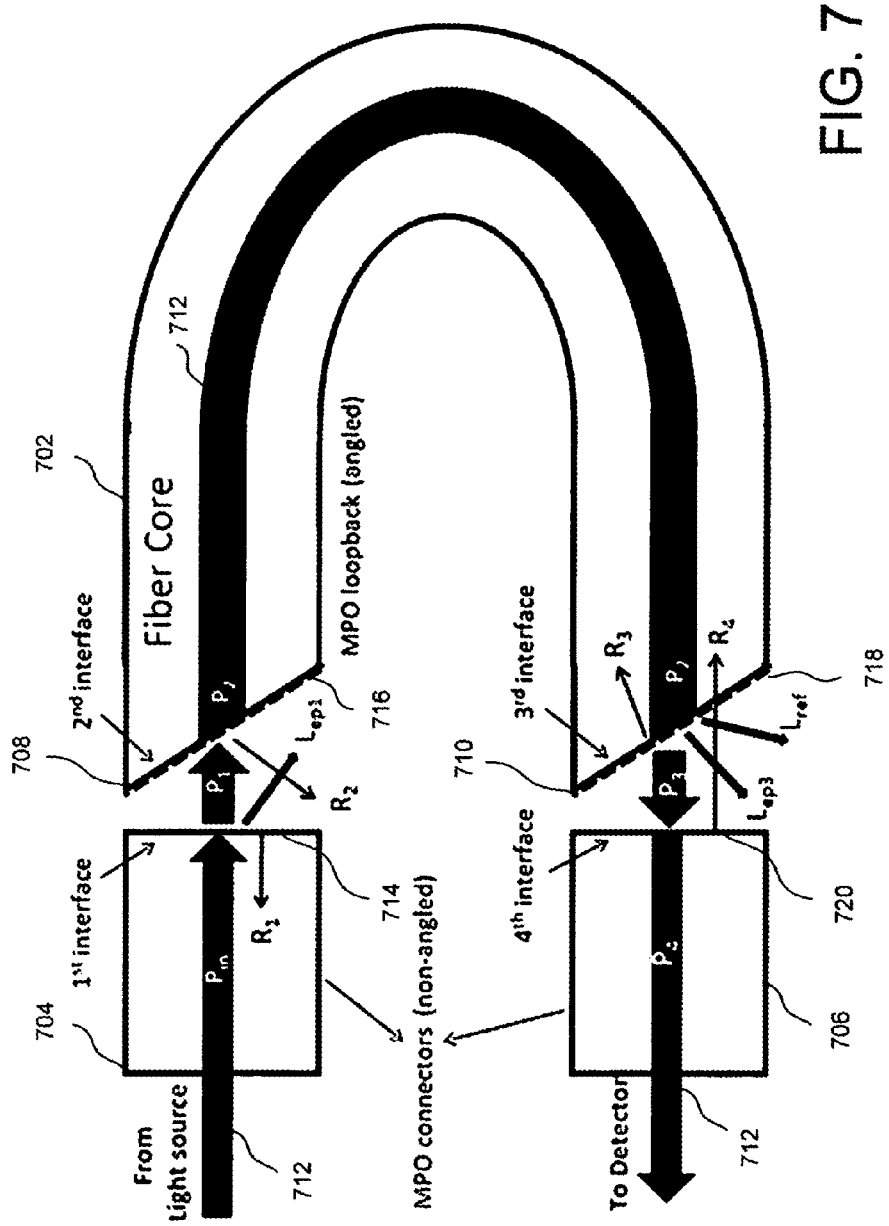
FIG. 7 shows MPO loopback assembly having angled ferrules connected to MPO connector having non-angled ferrules, in accordance with an embodiment of the present invention.

FIG. 7 shows a MPO loopback assembly 702 connected to a MPO connector having a first non-angled ferrule 704 and a second non-angled ferrule 706, in accordance with an embodiment of the present invention. MPO loopback assembly 702 has first angled ferrule 708 and second angled ferrule 710. First angled ferrule 708 is aligned and connected to first non-angled ferrule 704. Second angled ferrule 710 is aligned and connected to second non-angled ferrule 706.

A light 712 from a light source (not shown) having power Pin is incident on a first interface 714 of first non-angled ferrule 704 through a fiber in first non-angled ferrule 704. Light 712 is partially reflected at first interface 714, suffering reflection loss R1. Light 712 having power P1 enters a first gap between first non-angled ferrule 704 of MPO connector and first angled ferrule 708 of MPO loopback assembly 702. The first gap may be an air gap.

Figure 8:
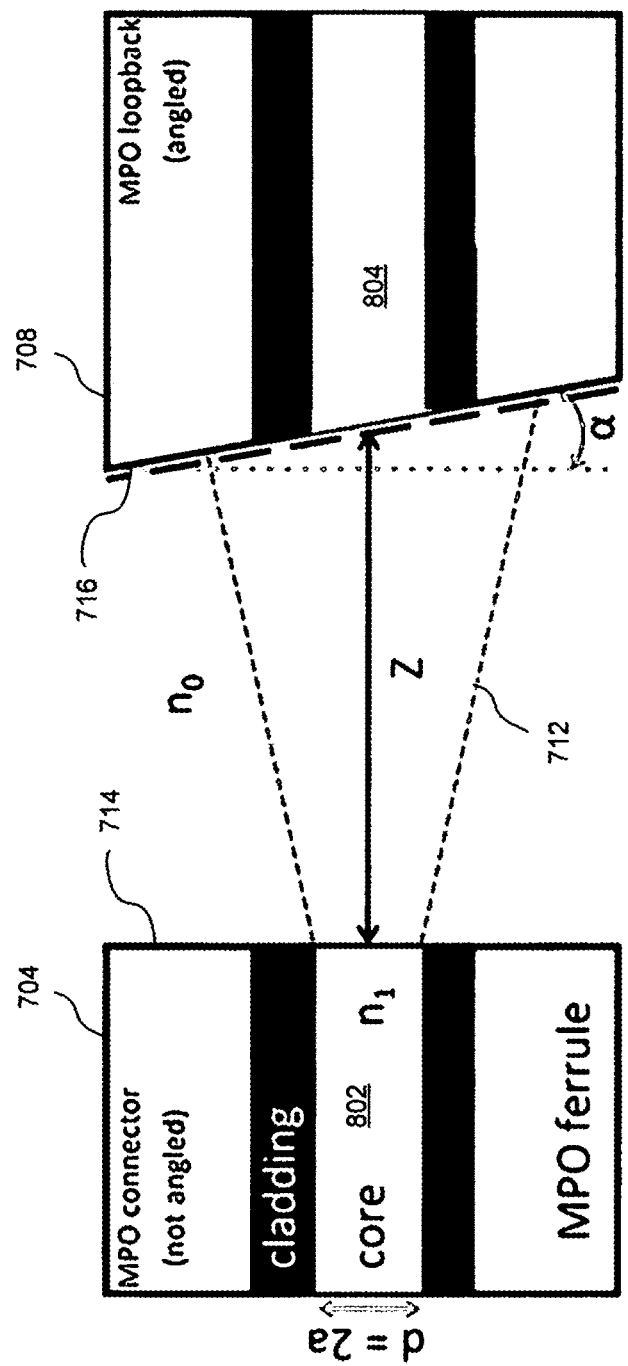
FIG. 8 shows light exiting from fiber core of non-angled ferrule of MPO connector expanding as it travels across air gap, in accordance with an embodiment of the present invention.

FIG. 8 shows that light 712 exiting from a fiber core 802 of first non-angled ferrule 704 of MPO connector expands as it travels across the first gap, in accordance with an embodiment of the present invention. When light 712 reaches first angled ferrule 708 of MPO loopback assembly, only a portion of light 712 enters fiber core 804 of first angled ferrule 708 of MPO loopback assembly that has an incident angle less than the critical angle of the fiber.

The loss caused by the light expansion in the first gap is Lep1 (see FIG. 7). The insertion loss in the first gap, ILgap, can be expressed as follows.

$$IL_{gap} = -10\log\left[1 - \frac{Z \times NA}{4an_0}\right] = -10\log[X(\alpha)], \quad \text{Equation (2)}$$

where Z is given by Equation (1), NA is the numerical aperture of the fiber, a is the fiber core radius, and no is the refractive index of the gap medium, e.g., air, and $$X(\alpha) = \frac{P_1}{(L_{ep1} + P_1)}, \quad \text{Equation (3)}$$

where P1 is the power of light 712 exiting from fiber core 802 of first non-angled ferrule 704 of MPO connector, and Lep1 is the light expansion loss in the first gap, and α is the polish angle of angled ferrule 708.

Light 712 arrives at a second interface 716 of MPO loopback assembly 702 having reflection R2, and enters a fiber of MPO loopback assembly 702 (see FIG. 7). The energy loss in the fiber is negligible. After traveling in the fiber of MPO loopback assembly 702, light 712 is partially reflected at a third interface 718, suffering reflection R3. Light 712 leaves the fiber of MPO loopback assembly 702, and enters a second gap between third interface 718 and a fourth interface 720 of second non-angled ferrule 706 of MPO connector. The second gap may be an air gap.

Similarly, there would be a light expansion loss Lep3 in the second gap (see FIG. 7). In addition, light 712 also has a refraction loss Lref in the second gap, which is caused by the light direction change after refraction at third interface 718.

Figure 9:
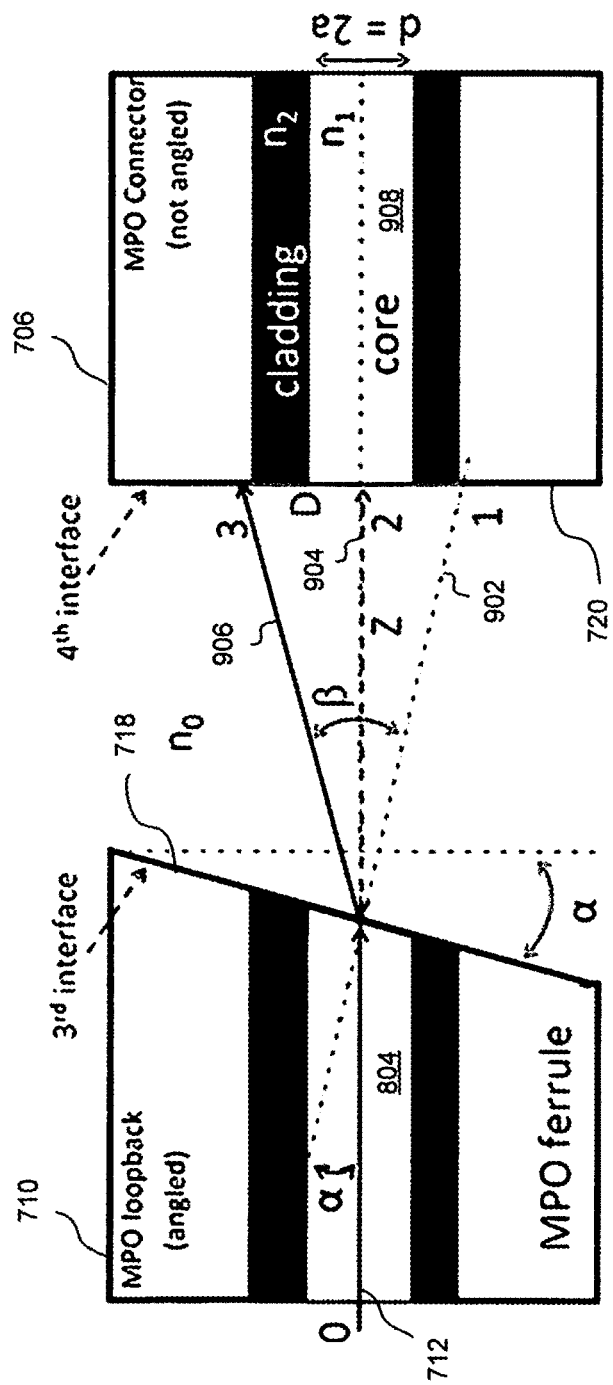
FIG. 9 shows light traveling in air gap between interface of angled ferrule of MPO loopback assembly and interface of non-angled ferrule of MPO connector, in accordance with an embodiment of the present invention.

FIG. 9 shows light traveling in the second gap between third interface 718 of second angled ferrule 710 of MPO loopback assembly 702 and fourth interface 720 of second non-angled ferrule 706 of MPO connector, in accordance with an embodiment of the present invention. Line 1 902 is a normal to third interface 718. Line 2 904 is a central axis of fiber core 804 of second angled ferrule 710 of MPO loopback assembly 702. Fiber core 804 extends from first angled ferrule 708 to second angled ferrule 710 of MPO loopback assembly 702. Line 3 906 represents a principal ray of light 712 in fiber core 804 (line 0) refracted at third interface 718. Due to refraction, line 3 906 forms an angle β relative to line 1 902, which is the normal of third interface 718. Based on Snell's law, one may derive angle β and a distance D between line 2 904 and line 3 906 at a fourth interface 720 of second non-angled ferrule 706 of MPO connector.

$$\beta = \sin^{-1}\left[\sin\alpha\left(\frac{n_1}{n_0}\right)\right], \quad \text{Equation (4)}$$

$$D = \left(\frac{H}{2} - h\right)\tan(\alpha)\tan(\beta - \alpha), \quad \text{Equation (5)}$$

where $n_1$ is the refractive index of fiber core 802, $n_0$ is the refractive index of the gap medium, e.g., air, α is the polishing angle of angled ferrule 710, which is the same as the polishing angle of angled ferrule 708.

Figure 10:
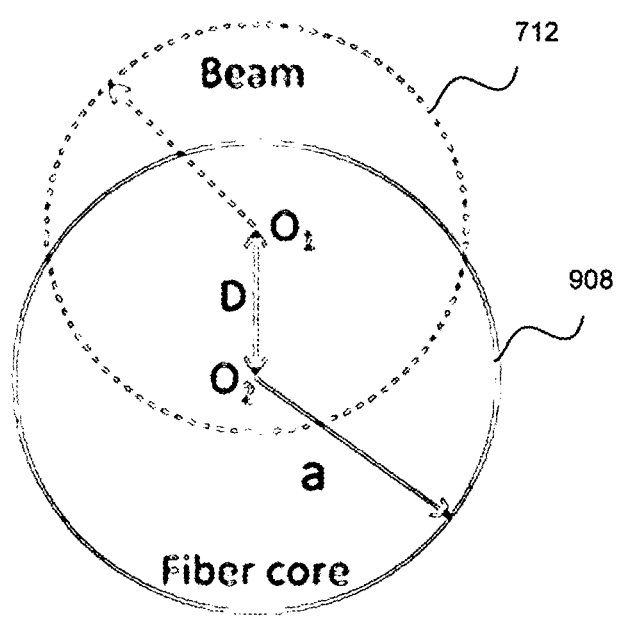
FIG. 10 shows vertical displacement D between center O1 of the refracted light and center O2 of fiber core of non-angled ferrule of MPO connector, in accordance with an embodiment of the present invention.

FIG. 10 shows the cross section of light 712 (line 3) at fourth interface 720 (see FIG. 9), in accordance with an embodiment of the present invention. FIG. 10 shows a vertical displacement D between a center O1 of the refracted light 712 and a center O2 of a fiber core 908 of second non-angled ferrule 706 of MPO connector. Power loss caused by the misalignment between light 712 and fiber core 908 can be expressed as follows.

$$Y(\alpha) = \frac{2}{\pi}\left\{\arccos\frac{D}{2a} - \left[1 - \left(\frac{D}{2a}\right)^2\right]^{1/2}\frac{D}{6a}\left[5 - \frac{D^2}{2a^2}\right]\right\}, \quad \text{Equation (6)}$$

where D is function of α given by Equation (5), and a is a radius of fiber core 908. One may further define $$L_{ref} = (\alpha)P_3(1 - X(\alpha)), \quad \text{Equation (7)}$$

where Y(α) is given by Equation (6), and X(α) is given by Equation (3).

Light 712 is incident on fourth interface 720 of second non-angled ferrule 706 of MPO connector, which is partially reflected suffering from reflection loss R4 (see FIG. 7). After passing through fourth interface 720 and entering fiber core 908 of second non-angled ferrule 706 of MPO connector (see FIG. 9), light 712 is detected by a detector (not shown).

Reflections R1-R4 at interfaces 714, 716, 718, and 720 may be adjusted to control the IL and RL of the MPO loopback assembly. The reflection at an air-glass interface may be designed to have any value in the range of 0-4%. The transmission T is (1−R), assuming all R1-R4 equal to R. The powers of light 712 at first interface to fourth interface 714, 716, 718, and 720, respectively, are as follow.

$$P_1 = TP_{in}, \quad \text{Equation (8)}$$

$$P_2 = X(\alpha)P_1 = TX(\alpha)P_{in}, \quad \text{Equation (9)}$$

$$P_3 = TY(\alpha)X(\alpha)P_2 = T^2(X(\alpha))^2 Y(\alpha)P_{in}, \quad \text{Equation (10)}$$

$$P_4 = P_{out} = TP_3 = T^3(X(\alpha))^2 Y(\alpha)P_{in}. \quad \text{Equation (11)}$$

Consider that reflection loss consists only the reflected light back to the input end through fiber 802 of first non-angled ferrule 704 of MPO connector, reflection loss generated at four interfaces can be expressed respectively as follow.

$$RL_1 = R, \quad \text{Equation (12)}$$

$$RL_2 = RT^4(X(\alpha))^2 Y(\alpha) \quad \text{Equation (13)}$$

$$RL_3 = RT^2 X(\alpha), \quad \text{Equation (14)}$$

$$RL_4 = RT^4(X(\alpha))^3 Y(a). \quad \text{Equation (15)}$$

Accordingly, the final IL and RL are expressed as follow.

$$RL = -10\log_{10}(RL_2 + RL_3 + RL_4) \quad \text{Equation (16)}$$

$$IL = -10\log_{10}\left(\frac{P_{out}}{P_1}\right).$$ Equation (17)

The final RL does not include RL1, and the final IL refers to P1, because the calculated values will be compared with the measured data in which P1 is used as the reference. Pin is not used as a reference in the measurement. It is appreciated that in a calculation, RL1 may be included, and Pin may be used as a reference in the measurement of IL.

Figure 11B:
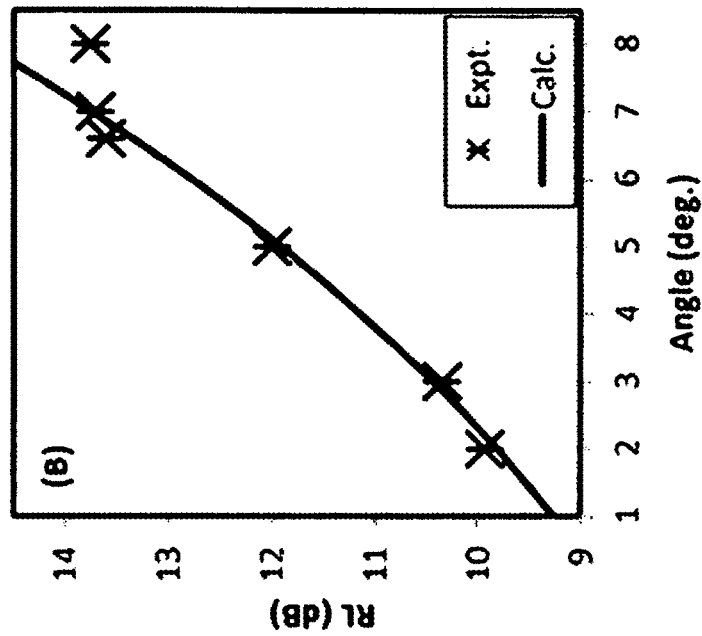
FIG. 11B shows calculated and measured values of RL, as functions of angle α, in accordance with an embodiment of the present invention.
Figure 11A:
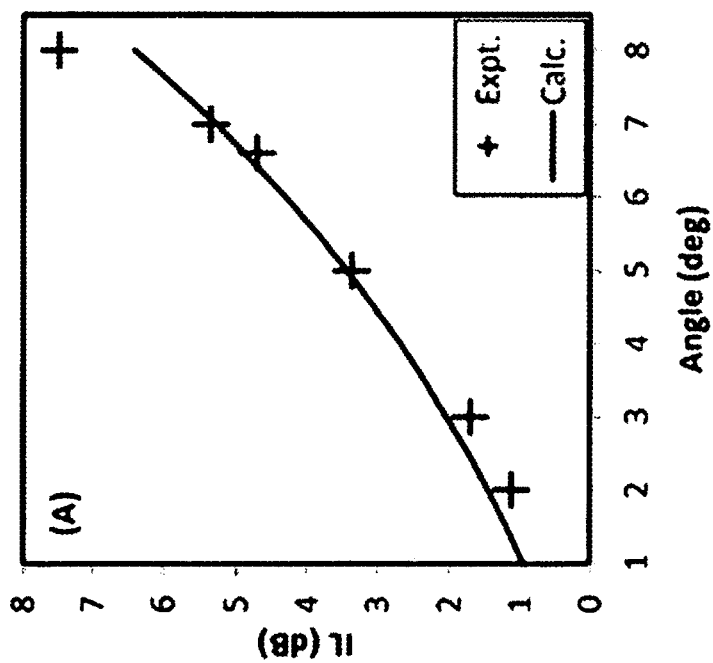
FIG. 11A shows calculated and measured values of IL.

FIG. 11A shows the calculated and measured values of IL as function of angle α according to Equation (17) for h=0 (no unpolished step), reflection at the interface R=4% (no AR coating), ferrule thickness H=2.45 mm, fiber core radius a=25 μm and numerical aperture NA=0.209, in accordance with an embodiment of the present invention. FIG. 11B shows the calculated and measured values of RL for the same case according to Equation (16), in accordance with an embodiment of the present invention. FIGS. 11A and 11B show reasonable agreements between calculated and measured values.

Figure 12B:
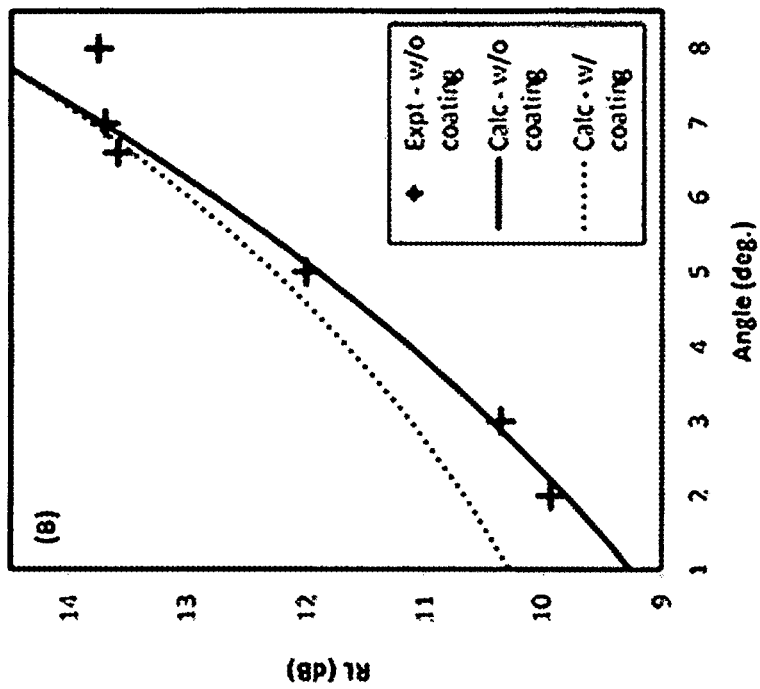
FIG. 12B shows calculated values of RL, as functions of angle α, in accordance with an embodiment of the present invention.
Figure 12A:
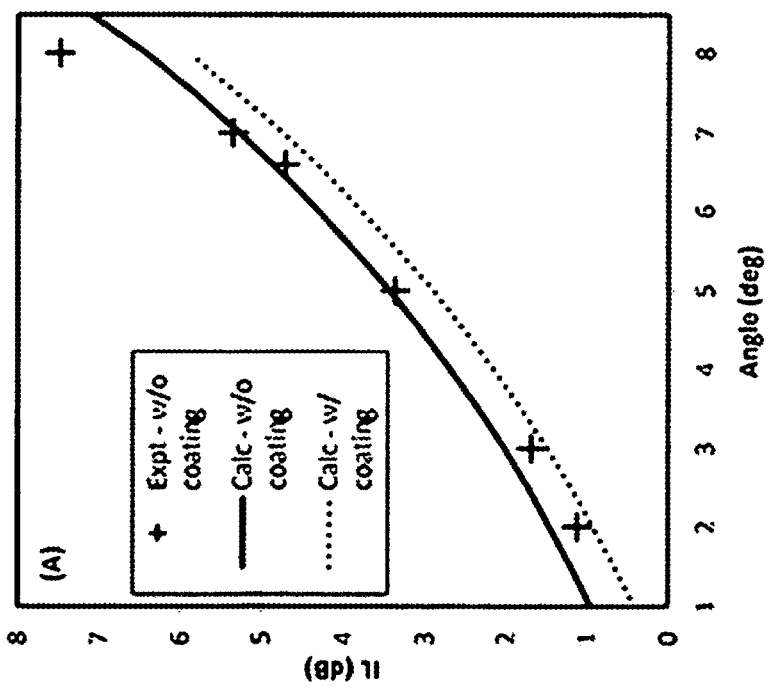
FIG. 12A shows calculated values of IL.

FIG. 12A shows the calculated vales of IL similar to FIG. 11A except reflection at the interface is R=0 (perfect AR coating), in accordance with an embodiment of the present invention. FIG. 12B shows the calculated values of RL for the same case, in accordance with an embodiment of the present invention. It appears that IL (dotted curve) decreases by 0.5 dB within a range of α=1-8 degrees. RL (dotted curve) changes significantly at small a, e.g., α=1 degree, but does not change at larger a, e.g., α=8 degree. RL changes about 1 dB at α=1 degree when reflection R changes from 4% to zero.

Figure 13B:
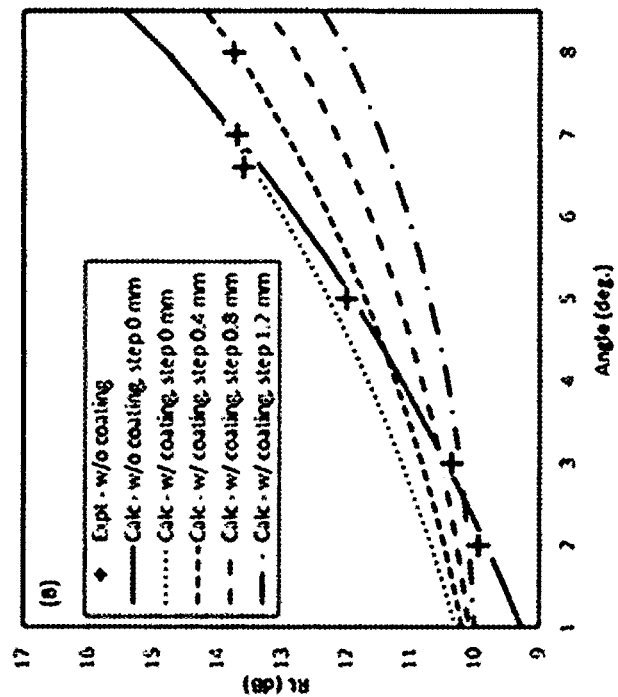
FIG. 13B shows calculated values of RL, as functions of angle α, in accordance with an embodiment of the present invention.
Figure 13A:
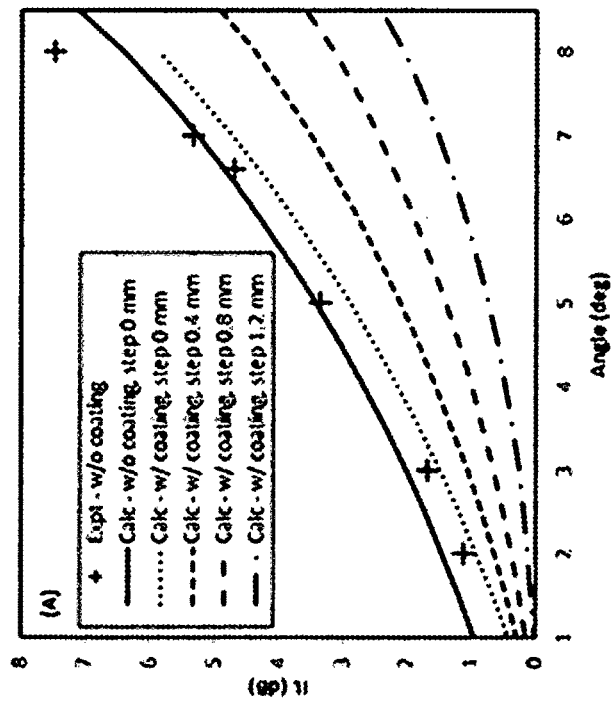
FIG. 13A shows calculated values of IL.

FIG. 13A shows the calculated vales of IL similar to FIG. 11A except for unpolished step h=0, 0.4 mm, 0.8 mm, and 1.2 mm, respectively, in accordance with an embodiment of the present invention. FIG. 13B shows the calculated values of RL for the same case, in accordance with an embodiment of the present invention. When unpolished step h increases, the air gap decreases for a constant angle, accordingly IL decreases and RL increases as expected. 100541 FIGS. 14A and 14B show an exemplary embodiment of the present invention. FIG. 14B shows a MPO loopback assembly 1400, which comprises an array of angled ferrules 1402 having 12 angled fibers in a row, in accordance with an embodiment of the present invention. FIG. 14A shows array of angled ferrules 1402 comprising first angled ferrules 1404 and second angled ferrules 1406, in accordance with an embodiment of the present invention. First angled ferrules 1404 are similar to first angled ferrules 708 of MPO loopback assembly of FIG. 7. Second angled ferrules 1406 are similar to second angled ferrules 710 of MPO loopback assembly of FIG. 7. First angled ferrules 1404 comprise fiber 1, fiber 2, fiber 3, fiber 4, fiber 5, and fiber 6. Second angled ferrules 1406 comprise fiber 7, fiber 8, fiber 9, fiber 10, fiber 11, and fiber 12. Fibers 1 and 12, 2 and 11, 3 and 10, 4 and 9, 5 and 8, 6 and 7 are connected, respectively. In other words, fibers 1 and 12, 2 and 11, 3 and 10, 4 and 9, 5 and 8, 6 and 7 are same fibers, respectively.

FIGS. 15A and 15B show an exemplary embodiment of the present invention. FIG. 15B shows a MPO loopback assembly 1500, which comprises an array of angled ferrules 1502 having 8 angled fibers in a row, in accordance with an embodiment of the present invention. The array 1502 may have 12 ferrules but 4 ferrules have no fibers. Thus, in this example, only 8 fibers are in use. FIG. 15A shows array of angled ferrules 1502 comprising first angled ferrules 1504 and second angled ferrules 1506, in accordance with an embodiment of the present invention. First angled ferrules 1504 are similar to first angled ferrules 708 of MPO loopback assembly of FIG. 7. Second angled ferrules 1506 are similar to second angled ferrules 710 of MPO loopback assembly of FIG. 7. First angled ferrules 1504 comprise fiber 1, fiber 2, fiber 3, and fiber 4. Second angled ferrules 1506 comprise fiber 5, fiber 6, fiber 7, and fiber 8. Fibers 1 and 5, 2 and 6, 3 and 7, 4 and 8, are connected, respectively. In other words, fibers 1 and 5, 2 and 6, 3 and 7, 4 and 8, are same fibers, respectively.

Figures 16A, 16B:
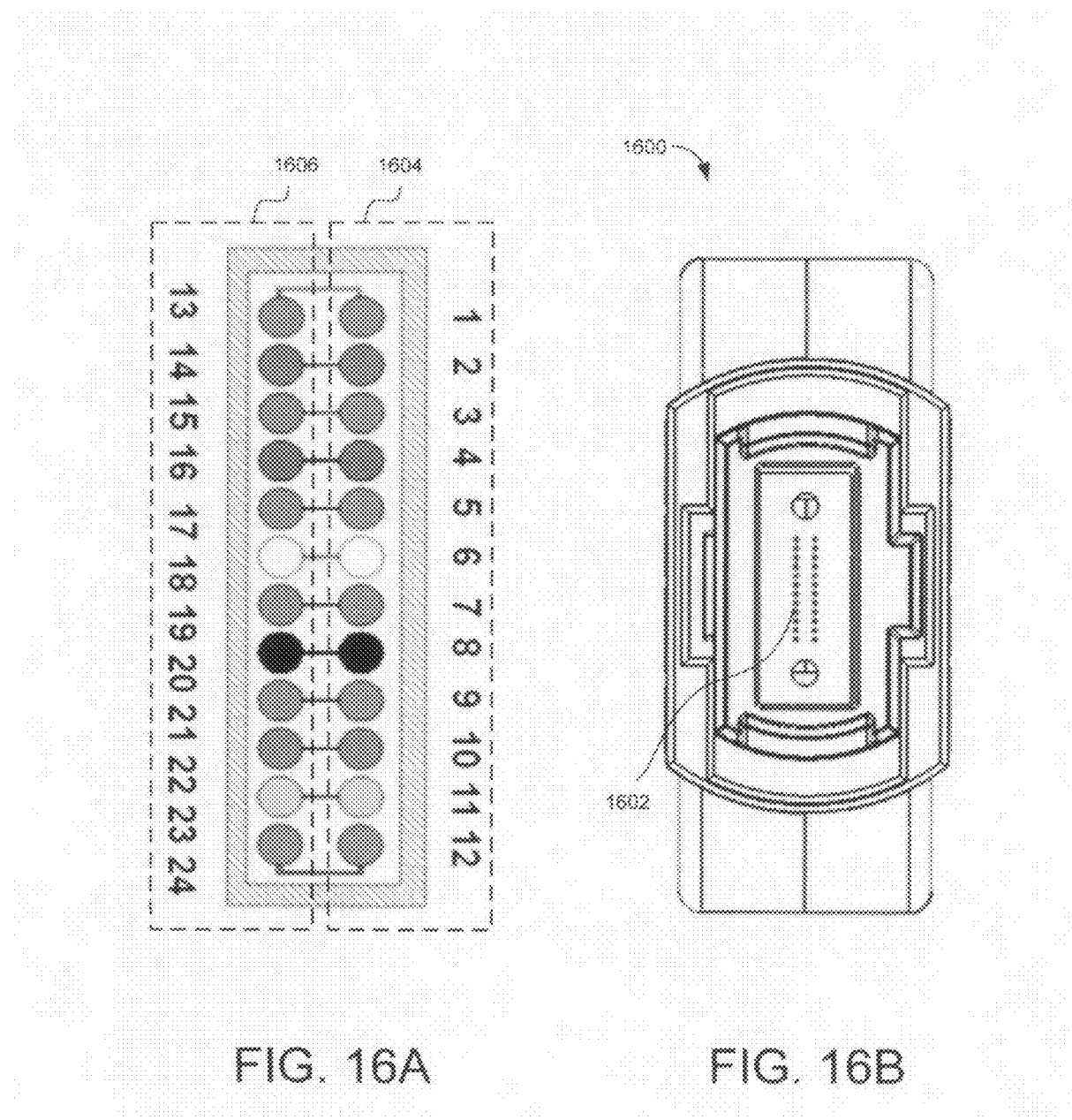
FIGS. 16A and 16B show an exemplary embodiment of the present invention using MPO loopback assembly.

FIGS. 16A and 16B show an exemplary embodiment of the present invention. FIG. 16B shows a MPO loopback assembly 1600, which comprises an array of angled ferrules 1602 having 24 angled fibers in two rows, in accordance with an embodiment of the present invention. FIG. 16A shows array of angled ferrules 1602 comprising first angled ferrules 1604 in a first row and second angled ferrules 1406 in second row, in accordance with an embodiment of the present invention. First angled ferrules 1604 are similar to first angled ferrules 708 of MPO loopback assembly of FIG. 7. Second angled ferrules 1606 are similar to second angled ferrules 710 of MPO loopback assembly of FIG. 7. First angled ferrules 1604 comprise fibers 1-12. Second angled ferrules 1406 comprise fibers 13-24. Fibers 1 and 13, 2 and 14, 3 and 15, 4 and 16, 5 and 17, 6 and 18, 7 and 19, 8 and 20, 9 and 21, 10 and 22, 11 and 23, 12 and 24 are connected, respectively. In other words, fibers 1 and 13, 2 and 14, 3 and 15, 4 and 16, 5 and 17, 6 and 18, 7 and 19, 8 and 20, 9 and 21, 10 and 22, 11 and 23, 12 and 24, are same fibers, respectively.

Figure 17:
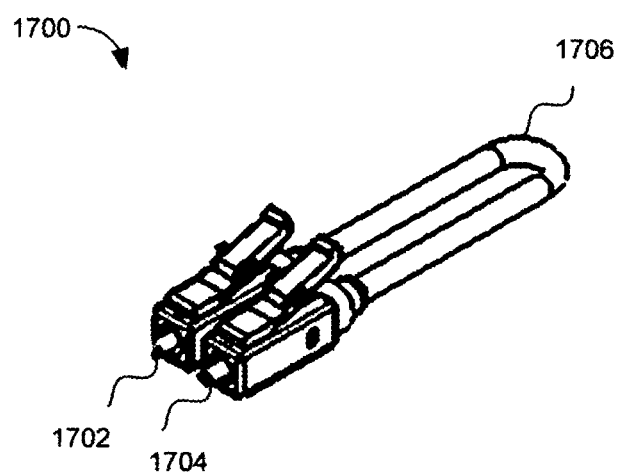
FIG. 17 shows an exemplary embodiment of the present invention using duplex fiber connector.

In addition to a MPO loopback assembly that comprises a plurality of fibers, a single fiber (SF) connector such as LC (Lucent Connector), FC (Ferrule Connector), and SC (Subscriber Connector) or other duplex connector may be designed for attenuation as well. FIG. 17 shows an exemplary duplex SF connector 1700 comprising a first angled ferrule 1702 and a second angled ferrule 1704, in accordance with an embodiment of the present invention. First angled ferrule 1702 and second angled ferrule 1704 may be separated. First angled ferrule 1702 may hold a first end of an angled fiber 1706, and second angled ferrule 1704 may hold a second end of angled fiber 1706. The duplex SF connector even offers design flexibility that angled ferrules 1702 and 1704 may have different combinations of polishing angle, unpolished step, and AR coating layer, which may be difficult for MPO loopback assembly comprising uniform ferrules to achieve. The angled ferrules may be used for a straight-mating oriented attenuator and for both MM fibers and even SM fibers that do not demand extremely high RL.

An apparatus is disclosed. The apparatus comprises a first array of angled ferrules and a second array of angled ferrules, and a plurality of angled fibers. The first ends of the plurality of angled fibers are held in the first array of angled ferrules and the second ends of the plurality of angled fibers are held in the second array of angled ferrules. The apparatus also comprises a first array of non-angled ferrules and a second array of non-angled ferrules. The apparatus further comprises a first plurality of non-angled fibers held in the first array of non-angled ferrules and a second plurality of non-angled fibers held in the second array of non-angled ferrules. The first array of angled ferrules is aligned and connected with the first array of non-angled ferrules and the second array of angled ferrules is aligned and connected with the second array of non-angled ferrules. The first array of angled ferrules and the first array of non-angled ferrules form a first gap, and the second array of angled ferrules and the second array of non-angled ferrules form a second gap. The light travels in the first plurality of non-angled fibers, exits from the first plurality of non-angled fibers passing through the first gap and entering the first ends of the plurality of angled fibers, exits from the second ends of the plurality of angled fibers passing through the second gap and entering the second plurality of non-angled fibers.

Another apparatus is disclosed. The apparatus comprises a first angled ferrule and a second angled ferrule, and an angled fiber. The first end of the angled fiber is held in the first angled ferrule and the second end of the angled fiber is held in the second angled ferrule. The apparatus also comprises a first non-angled ferrule and a second non-angled ferrule. The apparatus further comprises a first non-angled fiber held in the first non-angled ferrule and a second non-angled fiber held in the second non-angled ferrule. The first angled ferrule is aligned and connected with the first non-angled ferrule and the second angled ferrule is aligned and connected with the second non-angled ferrule. The first angled ferrule and the first non-angled ferrule form a first gap, and the second of angled ferrule and the second non-angled ferrule form a second gap. The light travels in the first non-angled fiber, exits from the first non-angled fiber passing through the first gap and entering the first end of the angled fiber, exits from the second end of the angled fiber passing through the second gap and entering the second non-angled fiber While the present invention has been described herein with respect to the exemplary embodiments and the best mode for practicing the invention, it will be apparent to one of ordinary skill in the art that many modifications, improvements and sub-combinations of the various embodiments, adaptations and variations can be made to the invention without departing from the spirit and scope thereof. For the disclosed methods, the steps need not necessarily be performed sequentially.

The terms used in the following claims should not be construed to limit the invention to the specific embodiments disclosed in the specification and the claims. Rather, the scope is to be determined entirely by the following claims, which are to be construed in accordance with established doctrines of claim interpretation. The present specification and figures are accordingly to be regarded as illustrative rather than restrictive.

What is claimed is:

1. An apparatus comprising:
   a first array of angled ferrules and a second array of angled ferrules;
   a plurality of angled fibers, wherein first ends of the plurality of angled fibers are held in the first array of angled ferrules and second ends of the plurality of angled fibers are held in the second array of angled ferrules;
   a first array of non-angled ferrules and a second array of non-angled ferrules;
   a first plurality of non-angled fibers held in the first array of non-angled ferrules;
   a second plurality of non-angled fibers held in the second array of non-angled ferrules;
   wherein the first array of angled ferrules is aligned and connected with the first array of non-angled ferrules and the second array of angled ferrules is aligned and connected with the second array of non-angled ferrules;
   wherein the first array of angled ferrules and the first array of non-angled ferrules form a first gap, and the second array of angled ferrules and the second array of non-angled ferrules form a second gap;
   wherein light travels in the first plurality of non-angled fibers, exits from the first plurality of non-angled fibers passing through the first gap and entering the first ends of the plurality of angled fibers, exits from the second ends of the plurality of angled fibers passing through the second gap and entering the second plurality of non-angled fibers; and
   one of, wherein the first array of angled ferrules and the second array of angled ferrules are in a first row and the first array of non-angled ferrules and the second array of non-angled ferrules are in a second row, the first row is aligned with the second row, and wherein the first array of angled ferrules is in a first row and the second array of angled ferrules is in a second row.

2. The apparatus of claim 1, wherein the first gap and the second gap are air gaps.

3. The apparatus of claim 1, wherein an anti-reflection layer is coated over ends of the first array of angled ferrules and the second array of angled ferrules.

4. The apparatus of claim 1, wherein the plurality of angled fibers, the first plurality of non-angled fibers, and the second plurality of non-angled fibers are one of multimode and single mode fibers.

5. The apparatus of claim 1, wherein the first array of angled ferrules and the second array of angled ferrules have an unpolished step.

6. The apparatus of claim 5, wherein a distance of the first gap between an angled fiber held in a ferrule of the first array of angled ferrules and a non-angled fiber held in a ferrule of the first array of non-angled ferrules is determined by the unpolished step, an angle of the first array of angled ferrules, and a thickness of the ferrule of the first array of angled ferrules.

7. The apparatus of claim 1, wherein the first array of angled ferrules and the second array of angled ferrules are in a Multiple-Fiber Push-On/Pull-Off (MPO) assembly.

8. The apparatus of claim 1, wherein the first array of non-angled ferrules and the second array of non-angled ferrules are in a MPO connector.

9. An apparatus comprising:
   a first angled ferrule and a second angled ferrule;
   an angled fiber, wherein a first end of the angled fiber is held in the first angled ferrule and a second end of the angled fiber is held in the second angled ferrule;
   a first non-angled ferrule and a second non-angled ferrule;
   a first non-angled fiber held in the first non-angled ferrule;
   a second non-angled fiber held in the second non-angled ferrule;
   wherein the first angled ferrule is aligned and connected with the first non-angled ferrule and the second angled ferrule is aligned and connected with the second non-angled ferrule;
   wherein the first angled ferrule and the first non-angled ferrule form a first gap, and the second angled ferrule and the second non-angled ferrule form a second gap;
   wherein light travels in the first non-angled fiber, exits from the first non-angled fiber passing through the first gap and entering the first end of the angled fiber, exits from the second end of the angled fiber passing through the second gap and entering the second non-angled fiber;
   wherein the first angled ferrule and the second angled ferrule have an unpolished step; and
   wherein a distance of the first gap between an angled fiber held in the first angled ferrule and a non-angled fiber held in the first non-angled ferrule is determined by the unpolished step, an angle of the first angled ferrule, and a thickness of the first angled ferrule.

10. The apparatus of claim 9, wherein the first gap and the second gap are air gaps.

11. The apparatus of claim 9, wherein an anti-reflection layer is coated over ends of the first array of angled ferrules and the second array of angled ferrules.

12. The apparatus of claim 9, wherein the first angled ferrule and the first non-angled ferrule are connected in one of LC (Lucent Connector), FC (Ferrule Connector), and SC (Subscriber Connector).

13. The apparatus of claim 9, wherein the first angled ferrule and the second angled ferrule are in a duplex fiber connector.

\* \* \* \* \*